United States Patent [19]

Ek

[11] Patent Number: 4,767,637
[45] Date of Patent: Aug. 30, 1988

[54] PREPARATION OF A FOOD COATING

[75] Inventor: Kurt L. Ek, Ekeby, Sweden

[73] Assignee: Nestec S. A., Vevey, Switzerland

[21] Appl. No.: 899,307

[22] Filed: Aug. 21, 1986

[30] Foreign Application Priority Data

Sep. 12, 1985 [EP] European Pat. Off. ........ 85111524.6

[51] Int. Cl.$^4$ ............................................. A23L 1/176
[52] U.S. Cl. .................................... 426/291; 426/94; 426/302
[58] Field of Search ............... 426/291, 292, 295, 296, 426/99, 128, 552, 517, 438, 439, 549, 553, 652, 302, 303, 92, 94, 96, 289

[56] References Cited

U.S. PATENT DOCUMENTS

| Re. 31,819 | 1/1985  | Weiss et al. ......................... 426/438 |
| 3,169,069  | 2/1965  | Hanson et al. ....................... 426/291 |
| 3,486,904  | 12/1969 | Ziegler . |
| 3,656,969  | 4/1972  | Horn .................................... 426/291 |
| 3,883,671  | 5/1975  | Shatila ................................. 426/441 |
| 3,950,550  | 4/1976  | Katayama et al. ................... 426/283 |
| 3,989,858  | 11/1976 | Williams .............................. 426/552 |
| 4,068,009  | 1/1978  | Rispoli et al. ....................... 426/293 |
| 4,330,566  | 5/1982  | Meyer et al. ......................... 426/293 |
| 4,423,078  | 12/1983 | Darley et al. ........................ 426/551 |
| 4,496,601  | 1/1985  | Rispoli et al. ....................... 426/289 |
| 4,622,225  | 11/1986 | Tu et al. .............................. 426/549 |

Primary Examiner—Donald E. Czaja
Assistant Examiner—Carolyn Paden
Attorney, Agent, or Firm—Vogt & O'Donnell

[57] ABSTRACT

A crumb coating for foods is prepared by heating and drying a layer of liquid batter on a surface to form a gelified, coagulated coherent sheet. The sheet is deep-fat fried, dried and then milled to crumbs. A food product is produced which does not require a deep-fat frying step to enable the adherence of the crumbs to the food.

16 Claims, No Drawings

PREPARATION OF A FOOD COATING

BACKGROUND OF THE INVENTIONS

The present invention relates to a process for the preparation of a food coating, more particularly to the preparation of a crumb coating.

In the preparation of frozen breaded food products such as fish, poultry, meat, crepes, etc., a food portion is generally coated with a batter, breaded, then cooked by deep-fat frying, cooled and finally deep-frozen. When required for consumption, the food product is usually heated in an oven to thaw it and cook it before serving. However, not only is deep fat frying messy and expensive but there is also a substantial loss of moisture which reduces the yield. In addition, in such a procedure the whole food product is cooked twice, once by deep-fat frying and once by oven heating: this double cooking causes the food product to lose its desirable crispiness and flavour. If, on the other hand, the deep-fat frying step is omitted so that the only cooking step is carried out by the consumer when heating in the oven, the coating does not adhere satisfactorily to the food portion, has an unattractive appearance and lacks the characteristic deep fried flavour, colour and crispiness.

SUMMARY OF THE INVENTIONS

A process has now been devised for preparing a crumb coating involving a deep-fat frying step, but when this crumb coating is applied to the surface of a food portion, surprisingly, the necessity of deep-fat frying the whole coated food portion before freezing is eliminated. The coated food portion may be prepared for consumption simply by heating in an oven in the usual way. The coating of the resultant cooked food product had an attractive appearance, colour, deep-fried flavour and a dramatically increased crispiness when compared with ordinary Japanese style breadcrumbs.

Accordingly, the present invention provides a process for the production of a crumb coating characterised in that a layer of liquid batter is formed on a heated surface, dried on the heated surface in such a way that it forms a coherent sheet, which sheet is detached from the heated surface, deep-fat fried, dried and finally milled to give crumbs of the desired particle size.

The present invention also provides a food product coated with a batter and breaded with a crumb coating prepared by the process of this invention.

DESCRIPTION OF PREFERRED EMBODIMENTS

The liquid batter consists essentially of a mixture of flour and water. Any type of flour may be used, for example, wheat, potato, tapioca, rye rice, semolina or corn but durum wheat flour is especially advantageous. Other optional ingredients which may be present in the liquid batter are, for example, wheat starch, eggwhite powder, salt, vegetable oil and sodium glutamate. The ingredients of the batter may be present in the proportions conventionally used in batters and a suitable batter is one used for preparing pastas, for example, cannelloni and lasagne. A typical liquid batter may contain from 20-25% flour, 8 to 12% wheat starch, 4.5 to 5.5% egg-white powder, 0.5 to 1.5% common salt, 0.5 to 1.0% vegetable oil, 0.1 to 0.5% sodium glutamate and from 55 to 65% water, all amounts being by weight based on the total weight of liquid batter.

The viscosity of the liquid batter measured on Flow Cup No. 4 is preferably from 20 to 32 seconds and especially from 24 to 28 seconds. All the ingredients of the liquid batter may conveniently be mixed in a reservoir equipped with a high speed mixer. The liquid batter may then be pumped to a smaller reservoir from which it may later be pumped to the heated surface. The pump may be, for instance, a mono-pump or similar pump preferably with a variable speed, for example, between 0 and 400 liters/hour.

The temperature of the heated surface is conveniently from 100° C. to 120° C. and preferably from 105° C. to 115° C. Desirably, the liquid batter is applied to the heated surface via a water-cooled jacketed tray in order to avoid too much heat transfer from the heated surface to the liquid batter before application, which could cause coagulation. A heated surface which has proved to be especially practical for carrying out the process of this invention is that of a drying cylinder, which is advantageously steam-heated and which may be rotated at such a speed that the drying time is from about 2 seconds to 30 seconds, preferably from 10 seconds to 25 seconds, to obtain a moisture content of from 30 to 50% and especially from 35 to 45% by weight based on the total weight of batter. The actual speed of rotation depends on the size of the drum but is usually up to 6 revolutions per minute.

During the drying, the liquid batter is gelified and coagulated to form the coherent sheet, preferably having a thickness of 0.5 to 2.0 mm and especially from 0.8 to 1.8 mm. The actual thickness is dependent on four variables, viz. the level in the tray, the speed of the drum dryer, the temperature of the surface of the drum dryer and the viscosity of the liquid batter. The coherent sheet may conveniently be detached by a knife, for instance, a doctor blade.

After being detached from the heated surface, the sheet whose temperature is about 90° C., is preferably cooled, conveniently to a temperature below 80° C., preferably below 75° C. and especially from 60° C. to ambient temperature, and advantageously cut into discrete portions before being deep-fat fried.

The cooling is conveniently carried out by transporting the sheet on a wire meshed cooling belt. The cutting of the sheet facilitates the deep-fat frying process and may suitably be carried out on another conveyor belt, for instance, made of rubber, equipped with cutters. For example, there may be a row of circular knives which cut the sheet into parallel longitudinal strips followed by a transverse knife to cut the longitudinal strips transversely into the portions which are approximately square, preferably having an area from 50 sq cms to 150 sq cms.

The portions are then transported into a deep-fat fryer containing a suitable edible oil, for example, a vegetable oil such as peanut oil, palm oil, soybean oil, cotton-seed oil or corn oil. The portions are suitably fried at a temperature from 140° C. to 200° C., preferably from 150° C. to 190° C. for a period of time from about 20 to 180 seconds, preferably from 30 to 120 seconds, the temperature and time being adjusted for portions of different moisture contents so that the desirable colour and deep-fat fried flavour are achieved. The fat content is conveniently from 20% to 30%, preferably from 23% to 27% by weight and the moisture content is conveniently from 4% to 6% by weight based on the total weight of the portions.

After leaving the deep-fat fryer, the portions are dried, for instance, by means of hot air in a convection oven. During drying the moisture content is conveniently reduced to from 1.5% to 2.5% by weight based on the total weight of the portions. After drying, the portions are milled to a particle size whereby the average diameter of the majority of the particles is from 0.25 to 1.0 mm. Preferably, cooling means are present during milling to prevent the fat melting. A suitable milling machine is a Comitrol milling machine.

The crumbs obtained are very crispy and can be used to coat a variety of raw or cooked food products, such as fish, meat, poultry, crepes etc. Such coated food products may be deep-frozen and may be prepared for consumption by simply heating in an oven to thaw and cook them. The products have a very desirable crispiness much superior to products coated with ordinary Japanese style breadcrumbs.

The following Example further illustrates the present invention. Parts and percentages are given by weight unless otherwise stated.

EXAMPLE

The following ingredients were mixed with a high speed stirrer in a reservoir:

| | |
|---|---|
| Durum wheat flour | 22.85% |
| Wheat starch | 10.20% |
| Eggwhite powder | 5.12% |
| Salt | 1.12% |
| Vegetable oil | 0.66% |
| Sodium glutamate | 0.23% |
| Water | 59.82% |

The viscosity of the liquid batter was such that it took 26 seconds to pass through Flow Cup No. 4.

The batter was pumped to a smaller reservoir from which it was later pumped at a speed of 100 liters per hour by a variable speed mono-pump via a water-cooled jacketed tray to the surface of a Gouda drum dryer ER 5/10, the drum of which had a diameter of 40 cm and a width of 60 cm. The drum was heated by steam so that the temperature at the surface was 110° C. and it rotated at 3 revolutions per minute causing the batter to gelify and coagulate to give a sheet having a thickness of 1.3 mm.

The dry sheet was separated from the surface of the drum by means of a doctor blade and then transported on a wire meshed conveyor belt where it was cooled to 50° C. The cooled sheet was then transferred onto a rubber conveyor belt equipped with a row of circular knives which cut the sheet into parallel longitudinal strips followed by a transverse knife which cut the longitudinal strips transversely into portions which had an area of approximately 100 sq cms.

The portions were then transported into a deep-fat fryer containing palm oil and fried at 180° C. for 60 seconds. The fat content was 25% and the moisture content was 5% based on the total weight. Afterwards the portions were dried in hot air and then milled in a Comitrol milling machine to give crumbs having the following particle sizes:

| PARTICLE SIZE | FRACTION |
|---|---|
| 3.15–2.0 mm | 2.4% |
| 2.0–1.0 mm | 2.8% |
| 1.0–0.5 mm | 49.9% |
| 0.5–0.25 mm | 44.7% |
| <0.25 mm | 0.2% |

The fat content of the dried crumbs was 29% and the moisture content was 2% based on the total weight of the crumbs.

The crumbs were very crispy and had an attractive colour and deep-fried fat flavour.

A fish product was coated with a batter and then breaded with the crumb coating prepared as above. When the food product was prepared for consumption by heating in an oven, the coating had an attractive appearance, colour, deep-fried flavour and a dramatically increased crispiness when compared with a similar food product coated with ordinary Japanese style breadcrumbs.

I claim:

1. A process for the production of a crumb coating comprising applying and drying a layer of liquid batter on a heated surface for forming a coherent sheet of gelified and coagulated batter, detaching the coherent sheet of dried batter from the heated surface, deep-fat frying the dried batter, drying the fried batter and finally milling the dried fried batter to crumbs.

2. A process according to claim 1 wherein the liquid batter is comprised of from 20% to 25% flour, from 55% to 65% water and from 10% to 25% of other ingredients selected from the group consisting of wheat starch, eggwhite powder, salt, vegetable oil and sodium glutamate and combinations thereof by weight based upon the total weight of the liquid batter.

3. A process according to claim 1 wherein the temperature of the heated surface is from 100° C. to 120° C.

4. A process according to in claim 3 wherein the heated surface is a drying cylinder rotated at a speed for drying the batter within from about 2 seconds to about 30 seconds for obtaining a moisture content of from 30% to 50% by weight based upon the total weight of the dried batter.

5. A process according to claim 1 wherein the thickness of the coherent sheet of dried batter is from 0.8 mm to 1.8 mm.

6. A process according to claim 1 further comprising cooling the coherent sheet of dried batter after detaching it from the heated surface.

7. A process according to claim 6 wherein the coherent sheet of dried batter is cooled to a temperature below 75° C.

8. A process according to claim 1 further comprising cutting the coherent sheet of dried batter into portions after detaching it from the heated surface.

9. A process according to claim 8 wherein the portions are deep-fat fried to a fat content of from 20% to 30% and a moisture content of from 4% to 6% by weight based upon the total weight of the portions.

10. A process according to claim 8 wherein the portions have an area of from 50 sq cms to 150 sq cms.

11. A process according to claim 1 wherein the liquid batter is dried to a moisture content of from 30% to 50% by weight based upon the total weight of the dried batter.

12. A process according to claim 11 further comprising cooling the coherent sheet of dried batter to a temperature below 80° C. after detaching it from the heated surface and then cutting the cooled sheet into portions prior to deep-fat frying the portions.

13. A process according to claim 12 further comprising avoiding heating the liquid batter prior to applying it on the heated surface and drying it.

14. A process according to claim 13 wherein the heated surface is at a temperature of from 100° C. to 120° C. and is a drying cylinder rotated at a speed for drying the batter within from about 2 seconds to about 30 seconds for obtaining the moisture content of from 30% to 50% by weight.

15. A process according to claim 12 wherein the portions are deep-fat fried to a fat content of from 20% to 30% and a moisture content of from 4% to 6% by weight based upon the total weight of the portions and then the fried portions are dried to a moisture content of from 1.5% to 2.5% by weight based upon the total weight of the portions.

16. A process for the preparation of a crumb coated food product comprising:
  applying and drying a layer of a liquid batter on a heated surface for forming a coherent sheet of gelified and coagulated batter;
  detaching the coherent sheet of dried batter from the heated surface;
  deep-fat frying the dried batter;
  drying the fried batter;
  milling the dried fried batter to crumbs; p1 coating a food with a coating batter; and
  coating the battered food with the crumbs.

* * * * *

UNITED STATES PATENT AND TRADEMARK OFFICE
CERTIFICATE OF CORRECTION

PATENT NO. : 4,767,637
DATED : August 30, 1988
INVENTOR(S) : Kurt L. EK

It is certified that error appears in the above-identified patent and that said Letters Patent is hereby corrected as shown below:

Column 6, line 13, [line 10 of claim 16], delete "pl".

All occurrences of "C.", except where "C." falls at the end of a sentence, should be --C--.

Signed and Sealed this

Thirty-first Day of January, 1989

Attest:

DONALD J. QUIGG

*Attesting Officer*    *Commissioner of Patents and Trademarks*